Oct. 15, 1935.  W. H. FURNESS  2,017,656
MECHANICAL MOVEMENT
Filed May 16, 1934
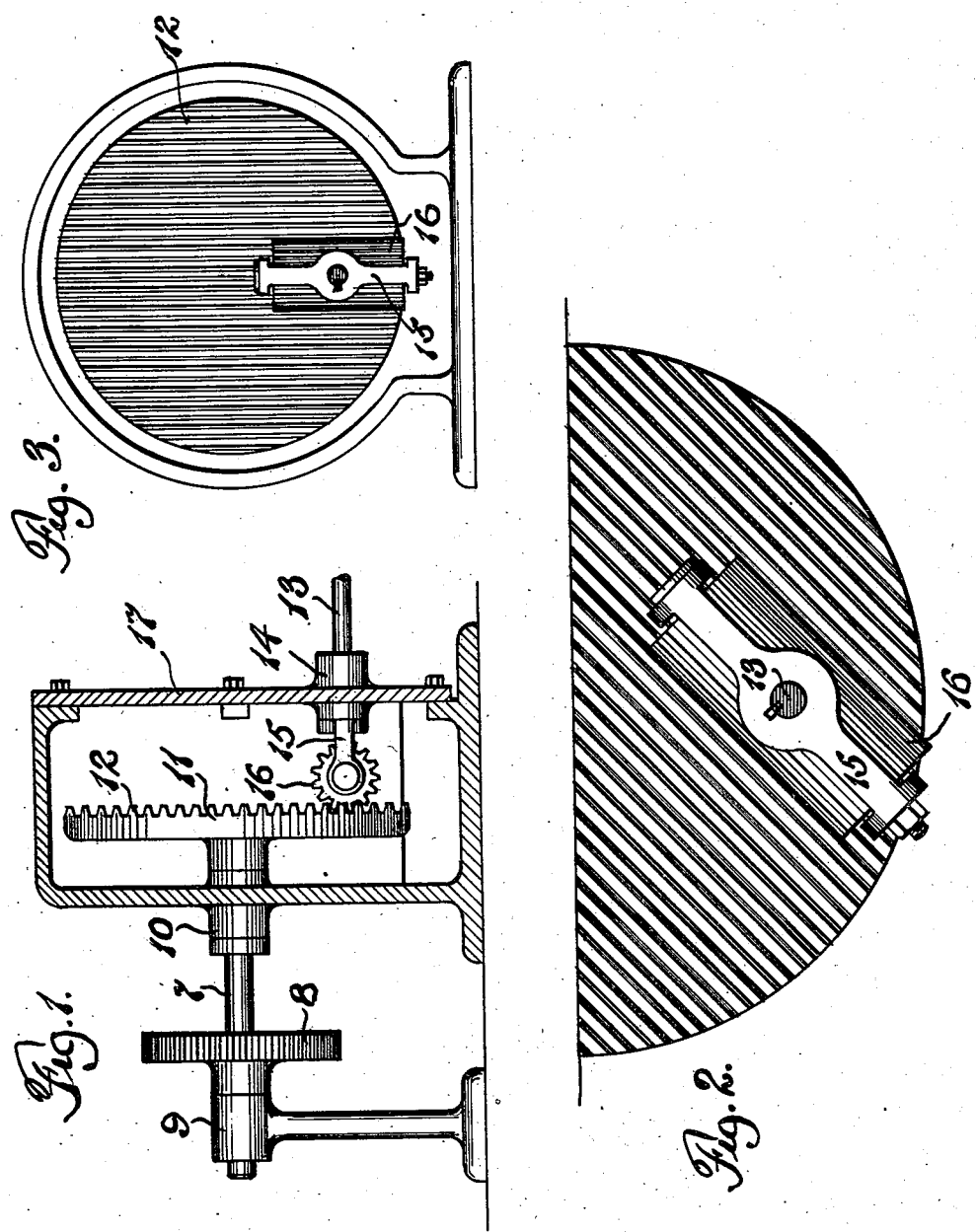
Witnesses,
Inventor,
William Henry Furness, Patented Oct. 15, 1935

2,017,656

UNITED STATES PATENT OFFICE 2,017,656

MECHANICAL MOVEMENT

William Henry Furness, Riverton, N. J., assignor to American Rayon Company, Inc., Riverton, N. J., a corporation of New Jersey Application May 16, 1934, Serial No. 725,865

7 Claims. (Cl. 74—63)

This invention relates to mechanical movements and while it has a number of uses, it is particularly applicable where it is desired to have a one-to-one ratio between two revolving offset members, as, for example, between a driving member and a driven member or between a relatively large diametered member and a small diametered member in which, for every revolution of the larger member, it is desired to have one revolution of the smaller member to maintain a predetermined relation between the members.

According to another aspect of my invention I propose to provide an improved irreversible transmission, as will hereinafter be more fully pointed out, for offset members.

For purposes of illustration I have shown my invention in very simple and more or less diagrammatic form in the accompanying drawing, wherein—

Figure 1 is a partial section and side elevation illustrating the nature of my improvement.

Figure 2 is an enlarged fragmentary view of certain portions of the apparatus, and Figure 3 is an end view of Figure 1 with the end plate removed and with the parts shown in a position at right angles to that whch they have in Figure 1.

Referring now to Figure 1, the reference numeral 7 may be taken to be a drive shaft or other revoluble member with respect to which it is desired to have another member rotate in a one-to-one ratio; the reference numeral 8 may be taken to be any suitable means for imparting rotation, such as a gear wheel; and the reference numerals 9 and 10 any suitable bearings. Mounted on and rotatable with the shaft 7 is a disk 11 which has parallel gear teeth 12 running in a direction across the face thereof.

The reference numeral 13 may be taken to indicate a driven shaft having suitable bearings 14 and having a yoke member 15 keyed to its inner end, the yoke member revolubly carrying a gear wheel or gear roller 16 the teeth of which mesh with the teeth 12 of the disk 11. The axes of the shafts 7 and 13 are parallel but laterally displaced with respect to one another.

When the disk 11 is rotated in either direction it will be seen that the gear wheel or roller 16 will cause the yoke 15 to revolve, the action being illustrated in the three figures. The shaft 13 will, of course, revolve with the yoke and the direction of revolution will be the same as that of the shaft 7. The gear wheel or roller 16, while imparting rotary movement to the yoke 15 about the axis of the shaft 13, revolves at its own axis, first in one direction and then in the other direction, the reversal taking place when the parts are in the position of Figure 1, in which the axis of the gear wheel is at the horizontal.

As long as power is applied in either direction to the shaft 7, the shaft 13 will be caused to be rotated in a truly one-to-one ratio. As soon as the application of power to the shaft 7 is cut off and it is at rest, the parts remain in position for it will be seen that it is impossible to rotate disk 11 from shaft 13. In other words the arrangement is physically irreversible. This makes the device capable of a variety of applications. For example, it can be used in hoisting and lowering apparatus where it is desired to have parts remain in a given position to which they have been moved. Again it is useful in reeling mechanism such as cable reels. In fact the device may be used almost wherever it is customary to employ ratchet mechanism either single or double. Another use is in steering mechanism for automobiles. If the device is incorporated in steering mechanism it will be seen that in case of a blow-out the reaction from the deflated tire cannot cause any shift from the running position of adjustment at the time of the blow-out. The operator, however, can still manipulate the steering wheel in the usual manner.

It will be understood that I have indicated only a few of the uses to which the invention may be put and that the drawing is to be taken as illustrating the general principle of the invention. For example, the member 12 may be stationary and the plate 17 rotated in which event in every revolution of plate 17 the shaft 13 will revolve once. Also the number of members 13 around the axis of rotation may be increased.

It will be apparent that the device is useful for setting controls as, for example, airplane controls and for retractible landing gears and any other places where the non-reversible characteristic is desirable.

I claim:—

1. A mechanical movement including a revoluble plate member having parallel teeth extending over a face thereof, a power take off shaft offset with respect to the plate, a gear member on the shaft meshing with teeth of the plate, and means for mounting said gear member to be revoluble on its own axis but otherwise revoluble as one with the shaft, said gear and mounting means constituting means for transmitting rotative movement from the plate member to the shaft in one to one ratio.

2. A mechanical movement including a pair of members one revoluble with respect to the other, parallel teeth extending across the face of one member, a power take off shaft mounted in the other for rotation in an axis parallel to the axis of rotation of the revoluble member, and a gear wheel non-rotatably mounted on the shaft but rotatable on its own axis, said wheel meshing with said teeth.

3. A transmission device including a revoluble plate having parallel teeth across a face thereof, a gear wheel meshing therewith, a support providing an axis of rotation of the wheel in a plane parallel to the face of the plate, a power take off shaft on which said support is mounted, and a bearing for rotatably mounting said shaft with its axis extending in the same direction as the axis of rotation of the plate.

4. In a power transmission for effecting one to one drive, a revoluble plate having parallel teeth extending across a face thereof, a gear wheel engaging said teeth, a yoke mounted for rotation on an axis extending in the same direction as the axis of rotation of the plate, means for rotatably mounting said gear wheel in the yoke, and a power take off shaft secured to said yoke axially thereof.

5. A mechanical movement comprising a plate having parallel teeth across a face thereof, bearing means for rotatably mounting said plate, a power take off shaft, bearing means for rotatably mounting said shaft in parallel relation to the axis of rotation of the plate, a gear wheel, and bearing means carried by the shaft for rotatably mounting said gear wheel in mesh with the teeth of said plate.

6. A mechanical movement including a revoluble plate member having parallel serrations extending over a face thereof, a power take off shaft having its axis extending in the same direction as the axis of rotation of the plate, and means movably mounted on the shaft and in engagement with the serrations of the plate, said means being movable along the said serrations and effecting the transmission of rotative movement of the plate to the shaft in one to one ratio.

7. A mechanical movement including a revoluble plate member having parallel serrations extending over a face thereof, a power take off shaft having its axis extending in the same direction as the axis of rotation of the plate, and means mounted on the shaft for movement relative to the shaft, said means having engagement with the serrations of the plate and being movable lengthwise of said serrations and constituting means for transmitting rotative movement of the plate to the shaft in one to one ratio.

WILLIAM HENRY FURNESS.